United States Patent
Clingerman et al.

(10) Patent No.: US 6,413,661 B1
(45) Date of Patent: Jul. 2, 2002

(54) METHOD FOR OPERATING A COMBUSTOR IN A FUEL CELL SYSTEM

(75) Inventors: Bruce J. Clingerman, Palmyra, NY (US); Kenneth D. Mowery, Noblesville, IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/461,581

(22) Filed: Dec. 15, 1999

(51) Int. Cl.[7] .............................. H01M 8/04; H01M 8/06
(52) U.S. Cl. ............................................ 429/17; 429/25
(58) Field of Search ............................. 429/13, 17, 19, 429/22–26

(56) References Cited

U.S. PATENT DOCUMENTS

| | | | |
|---|---|---|---|
| 4,098,960 A | * | 7/1978 | Gagnon |
| 4,128,700 A | | 12/1978 | Sederquist |
| 4,650,727 A | | 3/1987 | Vanderborgh et al. |
| 4,659,634 A | | 4/1987 | Struthers |
| 4,670,359 A | | 6/1987 | Beshty et al. |
| 4,923,768 A | | 5/1990 | Kaneko et al. |
| 4,994,331 A | | 2/1991 | Cohen |
| 5,248,567 A | | 9/1993 | Amemiya et al. |
| 5,271,916 A | | 12/1993 | Vanderborgh et al. |
| 5,272,017 A | | 12/1993 | Swarthirajan et al. |
| 5,316,871 A | | 5/1994 | Swarthirajan et al. |
| 5,484,577 A | | 1/1996 | Buswell et al. |
| 5,554,453 A | | 9/1996 | Steinfeld et al. |
| 5,605,770 A | | 2/1997 | Andreoli et al. |
| 5,637,415 A | | 6/1997 | Meltser |
| 5,763,113 A | | 6/1998 | Meltser et al. |
| 6,106,963 A | * | 8/2000 | Nitta et al. |
| 6,159,626 A | * | 12/2000 | Keskula et al. |
| 6,165,633 A | * | 12/2000 | Negishi |

FOREIGN PATENT DOCUMENTS

WO     WO 98/08771     3/1998

OTHER PUBLICATIONS

Szaniszlo, "The Advanced Low–Emissions Catalytic–Combustor Program: Phase I—Description and Status," ASME#79–GT–192, Mar. 1979.

Krill et al., "Catalytic Combustion for System Applications," ASME#79–HT–54, Dec. 1979.

Hall et al., "A Porous Media Burner for Reforming Methanol for Fuel Cell Powered Electric Vehicles," SAE Paper #950095 Feb.–Mar. 1995.

* cited by examiner

*Primary Examiner*—Gabrielle Brouillette
*Assistant Examiner*—Susy Tsang-Foster
(74) *Attorney, Agent, or Firm*—Karl F. Barr, Jr.; Cary W. Brooks; Linda M. Deschere

(57) ABSTRACT

In one aspect, the invention provides a method of operating a combustor to heat a fuel processor to a desired temperature in a fuel cell system, wherein the fuel processor generates hydrogen ($H_2$) from a hydrocarbon for reaction within a fuel cell to generate electricity. More particularly, the invention provides a method and select system design features which cooperate to provide a start up mode of operation and a smooth transition from start-up of the combustor and fuel processor to a running mode.

16 Claims, 2 Drawing Sheets

METHOD FOR OPERATING A COMBUSTOR IN A FUEL CELL SYSTEM

GOVERNMENT SUPPORT

The Government of the United States of America has right in this invention pursuant to Agreement No. DE-AC02-90CH10435 awarded by the U.S. Department of Energy.

FIELD OF THE INVENTION

This invention relates to a fuel cell system and more particularly to a combustor which heats a fuel processor which produces an $H_2$-rich feed gas for consumption in a fuel cell stack.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive solid polymer electrolyte membrane having the anode catalyst on one of its faces and the cathode catalyst on the opposite face. The MEA is sandwiched between a pair of electrically conductive elements which (1) serve as current collectors for the anode and cathode, and (2) contain appropriate channels and/or openings therein for distributing the fuel cells gaseous reactants over the surfaces of the respective anode and cathode catalysts. The term fuel cell is typically used to refer to either a single cell or a plurality of cells (stack) depending on the context. A plurality of individual cells are commonly bundled together to form a fuel cell stack and are commonly arranged in series. Each cell within the stack comprises the membrane electrode assembly (MEA) described earlier, and each such MEA provides its increment of voltage. A group of adjacent cells within the stack is referred to as a cluster. Typical arrangements of multiple cells in a stack are described in U.S. Pat. No. 5,763,113, assigned to General Motors Corporation.

In PEM fuel cells, hydrogen ($H_2$) is the anode reactant (i.e., fuel) and oxygen is the cathode reactant (i.e., oxidant). The oxygen can be either a pure form ($O_2$), or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and mixed with a proton conductive resin. The catalytic particles are typically costly precious metal particles. These membrane electrode assemblies are relatively expensive to manufacture and require certain conditions, including proper water management and humidification, and control of catalyst fouling constituents such as carbon monoxide (CO), for effective operation.

For vehicular applications, it is desirable to use a liquid fuel such as an alcohol (e.g., methanol or ethanol), or hydrocarbons (e.g., gasoline) as the source of hydrogen for the fuel cell. Such liquid fuels for the vehicle are easy to store onboard and there is a nationwide infrastructure for supplying liquid fuels. However, such fuels must be dissociated to release the hydrogen content thereof for fueling the fuel cell. The dissociation reaction is accomplished within a chemical fuel processor or reformer. The fuel processor contains one or more reactors wherein the fuel reacts with steam and sometimes air, to yield a reformate gas comprising primarily hydrogen and carbon dioxide. For example, in the steam methanol reformation process, methanol and water (as steam) are ideally reacted to generate hydrogen and carbon dioxide. In reality, carbon monoxide and water are also produced. In a gasoline reformation process, steam, air and gasoline are reacted in a fuel processor which contains two sections. One is primarily a partial oxidation reactor (POX) and the other is primarily a steam reformer (SR). The fuel processor produces hydrogen, carbon dioxide, carbon monoxide and water. Downstream reactors such as a water/gas shift (WGS) and preferential oxidizer (PROX) reactors are used to produce carbon dioxide ($CO_2$) from carbon monoxide (CO) using oxygen from air as an oxidant. Here, control of air feed is important to selectively oxidize CO to $CO_2$. A combustor typically is included in a fuel cell system and is used to heat various parts of the fuel processor, including reactors, as needed.

Fuel cell systems which process a hydrocarbon fuel to produce a hydrogen-rich reformate for consumption by PEM fuel cells are known and are described in U.S. patent application Ser. No. 08/975,422, which corresponds to U.S. Pat. No. 6,232,005 issued on May 15, 2001, in U.S. Ser. No. 08/980,087, which corresponds to U.S. Pat. No. 6,077,620 issued on Jun. 20, 2000, and in U.S. Ser. No. 09/187,125, which corresponds to U.S. Pat. No. 6,238,815 issued on May 29, 2001, each of which is assigned to General Motors Corporation, assignee of the present invention; and in International Application Publication Number WO 98/08771, published Mar. 5, 1998. A typical PEM fuel cell and its membrane electrode assembly (MEA) are described in U.S. Pat. Nos. 5,272,017 and 5,316,871, issued respectively Dec. 21, 1993 and May 31, 1994, and assigned to General Motors Corporation.

Efficient operation of a fuel cell system depends on the ability to effectively control operation of major interdependent components or subsystems such as the combustor and fuel processor. This is particularly difficult during start-up of a vehicular fuel cell system wherein the combustor heats up the fuel processor to a temperature sufficient for the fuel processor to generate hydrogen-rich feed for the fuel cell. It is also difficult to maintain combustor heat during transition from a start-up mode to a running mode where the combustor is at least partially fueled by the hydrogen-rich stream from the fuel processor.

Therefore, it is desirable to provide a method by which the fuel cell system is effectively operated during start-up and a running mode so that the combustor and fuel processor are operated efficiently.

SUMMARY OF THE INVENTION

The present invention is directed to the operation of a fuel cell system which comprises a combustor which heats a fuel processor which, in turn, generates a hydrogen-rich feed stream for use in a fuel cell stack. The hydrogen-rich feed stream is consumed in the fuel cell stack whereby electricity is produced. The present invention provides a new method for operating the combustor within the system and, particularly, an improved method for operating the combustor during start-up and transition to a running mode. In another aspect, the invention provides an improved system configuration and apparatus whereby start-up is achieved in a fuel efficient and effective manner.

In one aspect, the invention provides a method for operating a combustor to heat a fuel processor to a desired temperature during start-up in a fuel cell system. Here the term start-up indicates that the fuel processor is started from a relatively cold condition. Start-up includes commencing operation after the fuel processor was cooled down to below its desired operating temperature. The fuel processor generates a hydrogen-rich product (feed stream) from a hydrocarbon. The hydrogen-rich feed stream from the fuel processor is supplied to a fuel cell stack which generates electricity by oxidation of the hydrogen with oxygen. In a preferred start-up mode, a hydrocarbon fuel stream and an air stream are supplied to the combustor. The hydrocarbon fuel and air are reacted or burned in the combustor in order to generate heat to heat the fuel processor. The pressure of the air stream to the combustor is monitored. The products of the combustion reaction in the combustor are supplied to the fuel processor.

Preferably, the fuel processor is heated by indirect heat transfer from the products of combustion. After the products of combustion from the combustor have begun to heat the fuel processor, a hydrocarbon reactant is supplied to the fuel processor. The hydrocarbon reactant is reacted with steam, air, or a combination of both in the fuel processor. The reaction between the hydrocarbon reactant and the steam and/or air produces a hydrogen-rich feed stream which is usable in the fuel cell stack to produce electricity. However, at the outset of the fuel processing in the fuel processor, the hydrogen-rich ($H_2$) feed stream is often not of a quality suitable for the generation of electricity. Therefore, the hydrogen-rich stream may be directed in a flow path from the fuel processor directly to the combustor.

Initially, the flow path from the fuel processor to the combustor is at a relatively low pressure as compared to the pressure of the air stream being supplied to the combustor. Therefore, it is desirable during start-up to permit the pressure in the flow path from the fuel processor to the combustor to increase so that the pressure in the flow path to the combustor becomes greater than the pressure of the air stream in order to prevent back feed of the air stream into the flow path. By the method of the invention, the flow path from the fuel processor into the combustor remains closed until such pressurization has occurred. Thereafter, fluid flow communication from the flow path into the combustor is initiated whereupon the hydrogen-rich feed stream is admitted into the combustor for reaction therein with the air.

After the $H_2$-rich feed stream is admitted into the combustor, it is necessary to decrease the combustor's supply of the hydrocarbon fuel stream to regulate the generation of heat in the combustor. In a preferred aspect of the invention, the decrease in the supply of the hydrocarbon fuel stream is accomplished by progressively decreasing such supply in such a manner that the fuel input (FI) at time n is proportional to $(1-K) \times FI_{1-n}$. In one aspect, the K value remains a constant. The K value is selected or predetermined according to the dynamics of the system. In another aspect, the K value is selected from a look-up table where K varies over time. As can be appreciated, the method of the invention provides for flexibility in establishing the phasing-out of the supply of the hydrocarbon fuel stream to regulate the generation of heat in the combustor. In still another aspect of the invention, the step of decreasing the supply of the hydrocarbon fuel stream into the combustor does not occur immediately once the pressure in the flow path becomes greater than the pressure of the air stream. Rather, a time delay is implemented between the time the aforesaid pressure criteria is met and the decreasing of the supply of the hydrocarbon fuel is initiated. This controlled supply of $H_2$ rich stream and decrease of hydrocarbon fuel to the combustor provides a smooth and efficient transition into a running mode while substantially maintaining a desired level of heat output from the combustor.

In a preferred aspect, the above start-up mode of operation is accomplished by placing a check valve in the fuel cell system which is located in the flow path followed by the hydrogen-rich feed stream into the combustor. The pressure in the flow path is monitored upstream of the check valve. A second pressure monitor is located in the flow path of the air stream. Since the flow path of the air stream and the hydrogen-rich feed stream combine together in the combustor, the check valve provides an effective means to block the flow path of the hydrogen-rich feed stream into the combustor until the pressure of the hydrogen-rich feed stream exceeds the pressure of the air stream whereby the check valve is opened and permits the desired flow of hydrogen-rich feed stream and air into the combustor during start-up.

In another aspect, after the fuel processor has attained and maintained its desired temperature, it produces the hydrogen-rich stream which is consumed in the fuel cell stack to produce electricity. However, the quantity of hydrogen supplied to the fuel cell stack is greater than that required to produce the increment of power desired from the system, therefore, at least a portion of the hydrogen-rich feed stream is not consumed in the fuel cell stack and is directed to the combustor. This excess portion of the hydrogen-rich feed stream is reacted with the air stream in the combustor for generation of heat which is thereafter supplied to the fuel processor.

In a preferred aspect therefore, the fuel cell stack is arranged in the flow path between the fuel processor and the combustor and two variations are possible. In one variation during start-up, the hydrogen-rich feed stream produced by the fuel processor, which is initially of low quality, is directed to a flow path from the fuel processor directly to the combustor. In another variation during start-up, before the fuel cell stack begins to produce power, such low quality hydrogen-rich feed stream is supplied from the fuel processor through the fuel cell stack, where it is not consumed, and passes there through and is then directed to the combustor.

BRIEF DESCRIPTION OF THE DRAWINGS

The various features, advantages and other uses of the present invention will become more apparent by referring to the following description and drawings in which.

DETAILED DESCRIPTION OF THE PREFERRED EMBODIMENTS

In one aspect, the invention provides a method of operating a combustor to heat a fuel processor to a desired temperature in a fuel cell system, wherein the fuel processor generates hydrogen ($H_2$) from a hydrocarbon for reaction within a fuel cell to generate electricity. More particularly, the invention provides a method and select system design features which cooperate to provide a start up mode of operation and a smooth transition from start-up of the combustor and fuel processor to a running mode. During this transition period, the combustor mode of operation changes from one wherein a hydrocarbon fuel is reacted in the combustor to heat the fuel processor, to a mode where hydrogen-rich feed stream produced by the fuel processor is re-circulated back to the combustor for reaction therein to supply heat to the system. During running mode, the fuel processor generates hydrogen-rich feed for the fuel cell stack in an amount significantly greater than that required for consumption by the stack. Here, a portion of the hydrogen-rich feed stock is recirculated back to the combustor as stated.

Figure 1:
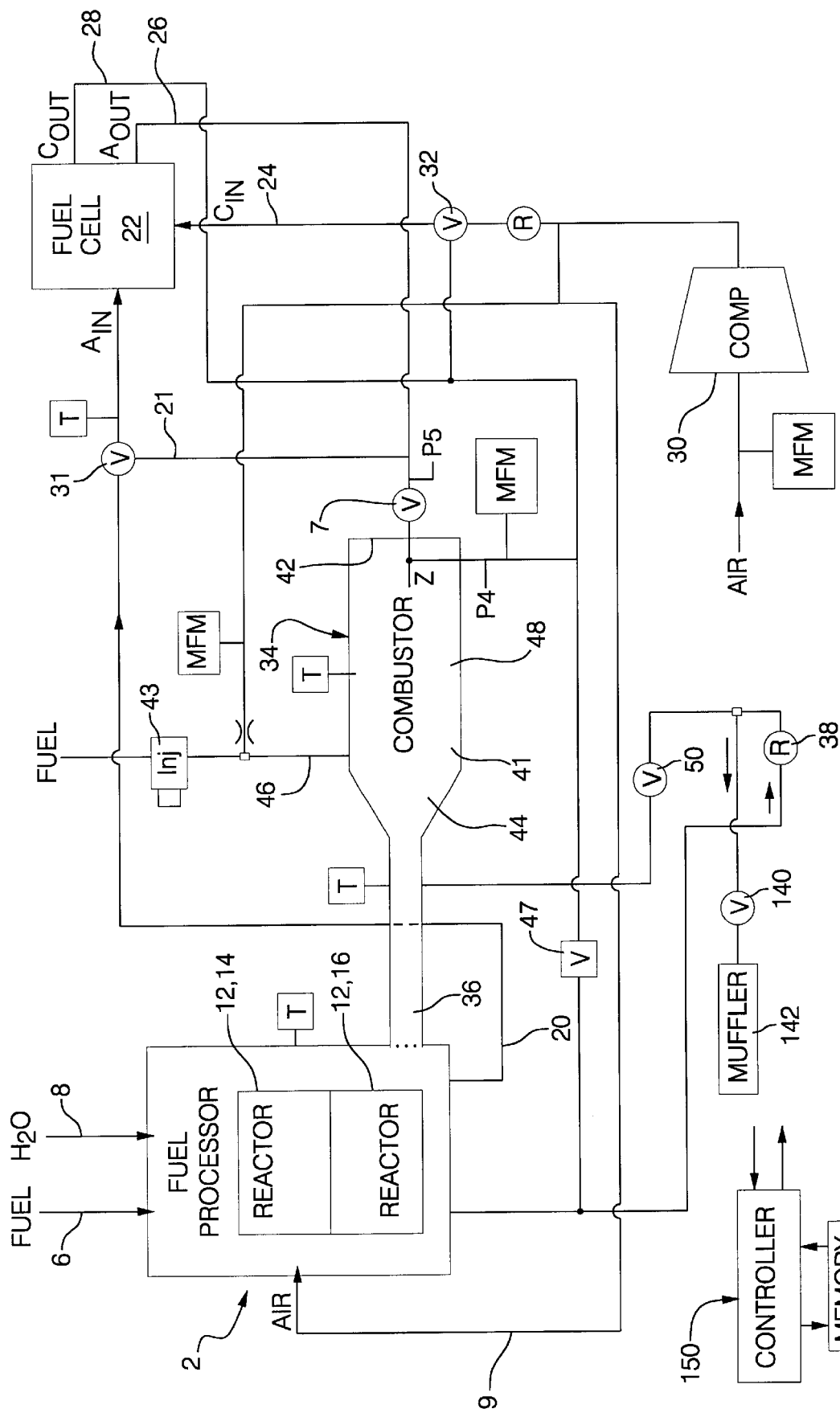
FIG. 1 is a drawing depicting a fuel cell system which comprises a combustor, fuel processor and fuel cell stack, operated according to the present invention.

The various aspects of the invention may be further understood with reference to the exemplary fuel cell system shown in FIG. 1. Therefore, before further describing the invention, it is useful to understand the system within which the preferred method of operation and apparatus features are implemented.

FIG. 1 illustrates an example of a fuel cell system. The system may be used in a vehicle (not shown) as an energy source for vehicle propulsion. In the system, a hydrocarbon is processed in a fuel processor, for example, by reformation and preferential oxidation processes, to produce a reformate gas which has a relatively high hydrogen content on a volume or molar basis. Therefore, reference is made to hydrogen-rich ($H_2$)or relatively high hydrogen content reformate or feed stream.

The invention is hereafter described in the context of a fuel cell fueled by an $H_2$-rich reformate regardless of the method by which such reformate is made. It is to be understood that the principles embodied herein are applicable to fuel cells fueled by $H_2$ obtained from any source, including reformable hydrocarbon and hydrogen-containing fuels such as methanol, ethanol, gasoline, alkene, or other aliphatic or aromatic hydrocarbons in liquid or gaseous forms.

As shown in FIG. 1, a fuel cell apparatus includes a fuel processor 2 for catalytically reacting a reformable hydrocarbon fuel stream 6, and water in the form of steam from a water stream 8. In some fuel processors, air is also used in a combination preferential oxidation/steam reforming reaction. In this case, fuel processor 2 also receives an air stream 9. The fuel processor contains one or more reactors 12 wherein the reformable hydrocarbon fuel in stream 6 undergoes dissociation in the presence of water/steam 8 and sometimes air (in stream 9) to produce the hydrogen-rich reformate. Further, each reactor 12 may comprise one or more reactor beds. Reactor 12 may have one or more sections or beds, and a variety of designs are known and usable. Therefore, the selection and arrangement of reactors 12 may vary; and exemplary fuel reformation reactor(s) 14 and downstream reactor(s) 16 are described immediately below.

By way of example, in an exemplary steam/methanol reformation process, methanol and water (as steam) are ideally reacted in a reactor 14 to generate hydrogen and carbon dioxide as described earlier in the background. In reality, carbon monoxide and water are also produced. By way of further example, in an exemplary gasoline reformation process, steam, air and gasoline are reacted in a fuel processor which comprises a reactor 14 which has two sections. One section of the reactor 14 is primarily a partial oxidation reactor (POX) and the other section of the reactor is primarily a steam reformer (SR). As in the case of methanol reformation, gasoline reformation produces the desired hydrogen but, in addition, produces carbon dioxide, water and carbon monoxide. After each type of reformation, it is desirable to reduce the carbon monoxide content of the product stream.

Accordingly, the fuel processor 2 also typically also includes one or more downstream reactors 16, such as water/gas shift (WGS) and preferential oxidizer (PROX) reactors which are used to produce carbon dioxide from carbon monoxide, as described earlier in the background. Preferably, the initial reformate output gas stream which comprises hydrogen, carbon dioxide, carbon monoxide (CO) and water is further treated in a preferential oxidation (PROX) reactor 16 to reduce the CO-levels therein to acceptable levels, for example, below 20 ppm. Then, during run mode, the $H_2$ rich reformate 20 is fed through valve 31 into the anode chamber of a fuel cell stack 22. At the same time, oxygen (e.g., air) from an oxidant stream 24 is fed into the cathode chamber of the fuel cell stack 22. Air for the oxidant stream 24 is provided by an air supply, preferably compressor 30. The hydrogen from the reformate stream 20 and the oxygen from the oxidant stream 24 react in the fuel cell 22 to produce electricity. Exhaust or effluent 26 from the anode side of the fuel cell 22 contains some unreacted hydrogen. The exhaust or effluent 28 from the cathode side of the fuel cell 22 contains some unreacted oxygen.

In normal running or operational conditions, air from the air supply (compressor 30) is directed to the fuel cell 22 by a valve 32. During start-up, however, the valve 32 is actuated to provide air directly to the input of a combustor 34. The air is used in combustor 34 to react with a fuel, preferably a liquid hydrocarbon, supplied through line 46. The heat of combustion is used to heat various parts of the fuel processor 2.

It should be noted that some of the reactions which occur in fuel processor 2 are endothermic and so require heat; other reactions are exothermic and require removal of heat. Typically, the PROX reactor 16 requires removal of heat. One or more of the reformation reactions in reactor 14 are typically endothermic. This is typically accomplished by preheating reactants fuel 6, steam 8, and air 9 and/or by heating selected reactors.

Heat from the combustor 34 is directed through line 36 to heat selected reactors and reactor beds in the fuel processor 2 during start-up. The combustor 34 achieves heating of the selected reactors and beds in the fuel processor 2, as necessary, by indirect heat transfer thereto. Typically, such indirectly heated reactors comprise a reaction chamber with inlet and an outlet. Within the reaction chamber, the beds are in the form of carrier member substrates each having a first surface carrying catalytically active material for accomplishing the desired chemical reactions. A second surface opposite the first surface is for heat transfer from hot gases to the carrier member substrates. In addition, the combustor 34 is usable to preheat the fuel 6, water 8 and air 9 being supplied as reactants to the fuel processor 2.

It should be noted that the air 9 supplied to the fuel processor 2 may be used in one or more of the reactors 12. If reactor 14 is a gasoline reformation reactor, then air from line 9 is supplied to reactor 14. The PROX reactor 16 also utilizes air to oxidize CO to $CO_2$ and also receives air from air supply source (compressor 30) via line 9.

The combustor 34 defines a chamber 41 with an inlet end 42, an exhaust end 44 and a catalyst section 48 between the ends. In a start up mode, hydrocarbon fuel 46 is injected into the combustor. The hydrocarbon fuel, if in liquid form, is preferably vaporized either before being injected into the combustor or in a section of the combustor to disperse the fuel for combustion. It is to be understood that although preferably disclosed as a liquid hydrocarbon fuel, the hydrocarbon may take another form such as a gas. Vaporization may be done by an electric heater. Once the system is operating and the combustor has heated up, vaporization may occur by heat exchange using heat from the combustor exhaust to vaporize incoming fuel. Preferably, a fuel metering device or injector 43 is provided to control the rate at which hydrocarbon fuel is provided to the combustor.

The hydrocarbon fuel 46 and the anode effluent 26 are reacted in the catalyst section 48 of the combustor 34, which section is between the inlet and exhaust ends 42 and 44, respectively, of the combustor 34. Oxygen is provided to the combustor 34 either from the air supply (i.e., compressor 30) via valve 32 or from a second air flow stream, such as a cathode effluent stream 28, depending on system operating conditions. A valve 50 permits release of the combustor exhaust 36 to the atmosphere when it is not needed to heat reactors in the fuel processor 2.

As can be seen from FIG. 1 and the above description, the hydrocarbon fuel stream 46 supplements the anode effluent 26 fuel for the combustor 34, as may be needed, to meet the transient and steady state needs of the fuel cell system. In some situations, exhaust gas passes through a regulator 38, a shutoff valve 140 and a muffler 142 before being released to the atmosphere. In FIG. 1, the symbols are as follows: "V" is valve, "MFM" is mass flow meter, "T" is temperature monitor, "R" is regulator, "C" is cathode side of the fuel cell, "A" is anode side of the fuel cell, "INJ" is injector, "COMP" is compressor, and "P" is pressure monitor.

The amount of heat demanded by the selected reactors within the fuel processor 2, which is to be supplied by the combustor 34, is dependent upon the amount of fuel and water input and ultimately the desired reaction temperature in the fuel processor 2. As stated earlier, sometimes air through line 9 is also used in the reformation reactor and must also be considered along with the fuel and water input. To supply the heat demand of the fuel processor 2, the combustor 34 utilizes all anode exhaust or effluent 26 and potentially some hydrocarbon fuel 46. Enthalpy equations are used to determine the amount of cathode exhaust air to be supplied to the combustor 34 to meet the desired temperature requirements of the combustor 34 and the combustor 34 ultimately satisfies the heat demanded by the fuel processor 2. The oxygen or air provided to the combustor 34 includes one or both of cathode effluent exhaust 28, which is typically a percentage of the total oxygen supplied to the cathode of the fuel cell 22, and an air stream from compressor 30 depending on whether the apparatus is operating in a start-up mode wherein the compressor air stream is exclusively employed, or in a run mode using the cathode effluent 28 and/or compressor air. In the run mode, any total air, oxygen or diluent demand required by the combustor 34, which is not met by the cathode effluent 28, is supplied by the compressor 30 in an amount to satisfy the temperature and heat demanded by the combustor 34 and the fuel processor 2, respectively. The air control is implemented via an air dilution valve 47 which preferably is a stepper motor driven valve having a variable orifice to control the amount of bleed-off of cathode exhaust 28 supplied to the combustor 34.

In this exemplary representation of a fuel cell apparatus, in one aspect of the invention, operation of the combustor and start-up in a fuel cell system is as follows. At the beginning of operations when the fuel cell apparatus is cold and starting up: (1) the compressor 30 is driven by an electric motor energized from an external source (e.g., a battery) to provide the necessary air to the system; (2) air is introduced into the combustor 34 and hydrocarbon fuel 46 (e.g., MeOH or gasoline) is injected into the combustor 34; (3) the air and fuel react in the combustor 34, where substantially complete combustion of the fuel is effected; and (4) the hot exhaust gases exiting the combustor 34 are conveyed through line 36 to the selected reactors 12 associated with the fuel processor 2.

Once the reactors 12 in the fuel processor 2 have attained adequate temperature, the reformation process begins and the process includes the following: (1) valve 32 is activated to direct air from compressor 30 to the cathode side of the fuel cell 22; (2) fuel 6 and water 8 are fed to the fuel processor 2 to commence the reformation reaction; (3) reformate exiting the fuel processor 2 through line 20 is fed to the anode side of the fuel cell 22; (4) anode effluent 26 from the fuel cell 22 is directed into the combustor 34; (5) cathode effluent 28 from the fuel cell 22 is directed into the combustor 34; (6) the fuel 46, air, cathode effluent 28 and anode effluent 26 are burned in the combustor 34. In a preferred sequence, step (2) is implemented first along with the supplying of air directly to the combustor. Then, when the hydrogen-rich stream has adequately low CO level, steps (1) and (3) are implemented, followed by steps (4), (5) and (6).

Under certain conditions, the combustor 34 could operate solely on the anode 26 and cathode 28 effluents, without the need for additional hydrocarbon fuel 46. Under such conditions, fuel injection to the combustor 34 is discontinued. Under other conditions, e.g., increased power demands, fuel 46 is provided to supplement the Aout, (26) to the combustor 34. It can be seen that the combustor 34 receives multiple fuels, such as a hydrocarbon fuel 46 as well as anode effluent 26 from the anode of the fuel cell 22. Oxygen depleted exhaust air 28 from the cathode of the fuel cell 22 and air from the compressor 30 are also supplied to the combustor 34.

According to the present fuel cell system example, a controller 150 shown in FIG. 1 controls various aspects of the operation of the system shown in FIG. 1. The controller 150 may comprise any suitable microprocessor, microcontroller, personal computer, etc., which has a central processing unit capable of executing a control program and data stored in a memory. The controller 150 may be a dedicated controller specific to any of the components in FIG. 1, or implemented in software stored in the main vehicle electronic control module. Further, although software based control programs are usable for controlling system components in various modes of operation as described above, it will also be understood that the control can also be implemented in part or whole by dedicated electronic circuitry. The controller 150 controls the injector 43 thereby regulating the rate of hydrocarbon fuel fed to the combustor 34. The controller 150 monitors pressure P, particularly, second pressure monitor P4 and first pressure monitor P5 described below. Preferably, controller 150 regulates the operation of injector 43 to control supply of fuel to the combustor 34.

Figure 2:
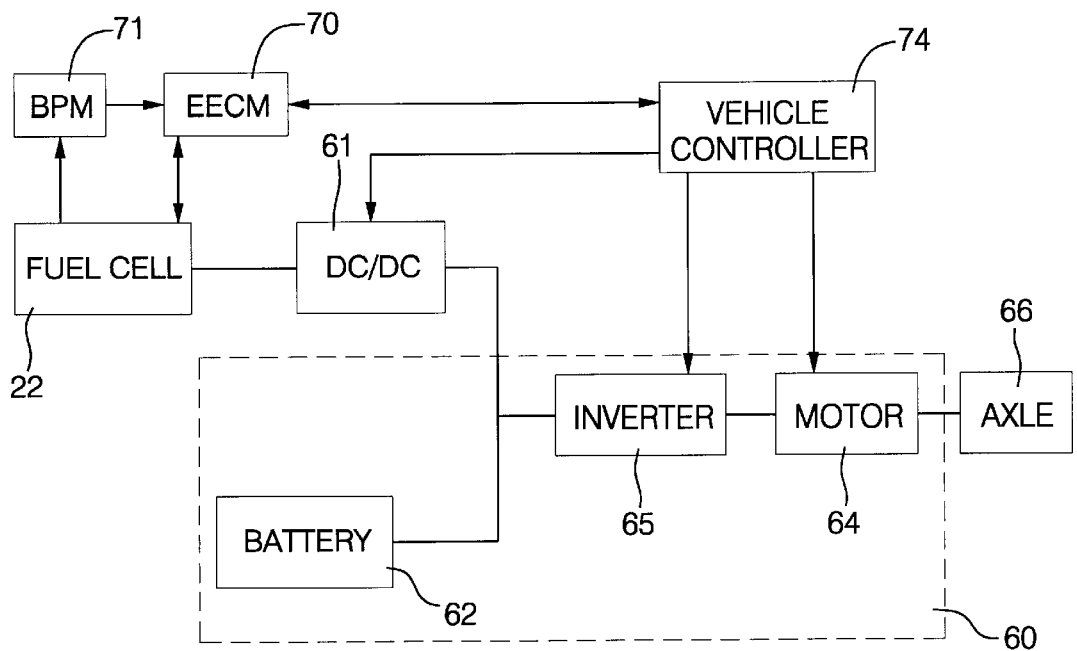
FIG. 2 is a drawing of the fuel cell stack shown in FIG. 1 connected in a pictorial representation of a use application.

In a preferred embodiment, the fuel cell system comprises the fuel cell 22 as part of a vehicle propulsion system 60 (see FIG. 2). Here, a portion of the circuit 60 external to fuel cell system, comprises a battery 62, an electric motor 64, and associated drive electronics including inverter 65 constructed and arranged to accept electric energy from a DC/DC converter 61 associated with the fuel cell system, and particularly fuel cell 22, and to convert it to mechanical energy produced by motor 64. The battery 62 is constructed and arranged to accept and store electrical energy supplied by fuel cell 22 and to accept and store electrical energy supplied by motor 64 during regenerative braking, and to provide electric energy to motor 64. The motor 64 is coupled to driving axle 66 to rotate wheels of a vehicle (not shown). An electrochemical engine control module (EECM) 70 and a battery pack module (BPM) 71 monitor various operating parameters, including, but not limited to, the voltage and current of the stack. For example, this is done by the battery pack module (BPM) 71, or by the BPM 71 and the EECM 70 together, to send an output signal (message) to the vehicle controller 74 based on conditions monitored by the BPM 71. The vehicle controller 74 controls the electric motor 64, the drive electronics including inverter 65, the DC/DC converter 61, and requests a power level from the EECM 70.

Referring to the above described system and exemplary representation of apparatus in a start-up mode and operation after start-up, it can be appreciated that starting a fuel cell system requires carefully coordinated steps. The system has three important components. The fuel cell stack 22, the combustor 34, and the fuel processor 2 as shown in FIG. 1. An interdependent relationship exists between these major components. The fuel processor 2 supplies hydrogen to the stack 22. A portion of hydrogen supplied to the stack 22 is directed to the combustor 34. The combustor 34 supplies heat to the fuel processor 2. When the operation of these major systems is in a relative balance, energy production and consumption are in relative balance. However, it can be appreciated that in the start-up mode, such balance does not exist.

It can be appreciated that a start-up mode is a condition where the combustor 34 and fuel processor 2 are not up to the desired running mode operating temperature. This condition will exist from a cold start and from a start condition which is implemented from the termination of a previous running mode where the system has been allowed to cool from its optimal operating temperature conditions. In order to start the system, before the fuel processor 2 produces hydrogen, the combustor 34 is first started. The combustor is typically heated by the use of external fuel 46 which is preferably a liquid hydrocarbon fuel. Such hydrocarbon fuel 46 may be the same as or different from the fuel 6 that is used as a reactant in the fuel processor. The delivery of air by compressor 30, and fuel 46 through injector 43, initiates the start-up mode. The compressor 30 provides the air flow and the injector 43 provides the liquid hydrocarbon fuel to the combustor 34 which converts the fuel to heat, and delivers the heat to fuel processor 2 through line 36. In fuel processor 2, the heat is used to preheat input reactants, fuel 6, water 8, and/or air 9 and also to preheat selected reactors 12 as necessary. Such preheat is typically done by indirect heat transfer using appropriate heat exchangers (not shown) within fuel processor 2.

After the fuel processor 2 heats up, preferably hydrocarbon fuel 6 referred to as one of the reactants, is injected into the fuel processor 2. The hydrocarbon reactant 6 is reacted with water 8 (steam), air, or both to convert the hydrocarbon reactant to a hydrogen-rich ($H_2$) stream. The hydrogen-rich feed stream also contains other constituents such as water, carbon monoxide, and carbon dioxide. These gases ultimately flow to the fuel cell stack 22 through line 20 as described earlier. During start-up, preferably, such hydrogen-rich feed stream is diverted through line 21 to the combustor 34 when the fuel processor 2 first starts up, mainly due to the production of a relatively high amount of carbon monoxide. Thus, bypass of fuel cell stack 22 is achieved via valve 31 as desired. Therefore, on start-up, the $H_2$-rich reformate can either go through the stack or through bypass 31 and down line 21 to bypass the stack. It is preferred that the reformate bypass the stack on start-up and eventually valve 31 directs reformate through stack 22. Preferably, valve 31 switches reformate flow from bypass to the stack when the CO content of the reformate is sufficiently low. Preferably, valve 32 switches when valve 31 switches to maintain a suitably low pressure difference in the stack. Preferably, check valve 7 opens based on pressure criteria described hereinbelow with respect to P4 and P5, and independent of valve 31.

Even during a running mode, stack 22 does not consume all of the hydrogen feed produced by the fuel processor 2, so some portion of the hydrogen feed passes through the stack 22 and onto the combustor 34. The combustor 34 at this point may no longer need the amount of liquid hydrocarbon fuel 46 provided through injector 43, since the stack 22 is providing the necessary hydrogen feed as a fuel to the combustor 34. Under this transition condition, the amount of liquid fuel 46 injected through injector 43 needs to be decreased because its heating value is offset by the hydrogen containing anode effluent 26. The transition when the combustor 34 shifts from running entirely on liquid fuel 46 through injector 43 and switches to running on hydrogen, either through bypass line 21 or anode effluent 26 is a very difficult and critical transition. This is particularly the case because hydrogen flow to the combustor 34 is not readily determinable.

In another aspect of the invention, various system components are provided and a mode of operation is provided to control the delicate transition from when the combustor 34 runs on liquid fuel 46 and switches to running on hydrogen produced by the fuel processor 2. In one aspect, the invention provides means to approximate when the fuel processor hydrogen feed (effluent) 26 begins flowing to the combustor. By monitoring a pressure difference across a check valve 7, such flow is indicated. A further aspect of the invention includes a timer which provides a time delay to approximate the period of time from when flow begins to when hydrogen feed actually reaches the combustor. In another aspect, a first order lag filter (lag function) approximates the phase in of hydrogen feed from the fuel processor.

More particularly, prior to the fuel processor starting, the anode path, generally designated as 20, and as 26 in FIG. 1 downstream of the fuel processor 2, remains close to barometric pressure which pressure is indicated by monitor P5 in FIG. 1. This occurs because the immediately preceding system shutdown evacuated stack 22 of high pressure hydrogen-rich feed during the normal shutdown. The stack 22 may have a small amount of the hydrogen feed stream in it, depending on the specific shutdown procedure. Other shutdown procedures include replacing the anode hydrogen feed stream with air or an inert gas such as nitrogen. Therefore, it can be appreciated that a portion of the system designated on FIG. 1 may have a small amount of hydrogen-rich feed stream at a relatively low pressure or may include air or other inert gas, such as nitrogen. More particularly, such portion of the system includes line 20 through and to valve 31 and through the stack and down through line 26 and through line 21. Accordingly, such portion is under the stated low or barometric pressure condition before start-up.

During start-up, the air flow from the compressor 30 creates about 200 kPa absolute pressure as indicated by pressure monitor shown P4 in FIG. 1. During start-up, check valve 7 is closed preventing fluid flow communication between the air line and the lower pressure hydrogen flow lines described above. The fuel processor 2 starts generating hydrogen, carbon monoxide, and carbon dioxide as hydrocarbon reactant 6 and water 8 and/or air through line 9 are provided to it. With this injected mass flow, the pressure at first pressure monitor P5 begins to rise. This can be seen by referring to the time period designated A through B in FIG. 3. Until the pressure at monitored P5 becomes slightly higher than the pressure monitored at P4, the check valve 7 remains closed. Once the pressure at P5 rises sufficiently so that it becomes greater than the pressure at second pressure monitor P4, then check valve 7 opens and whereupon the hydrogen-rich stream is thereby able to enter the combustor 34 through check valve 7. See point B in FIG. 3.

The hydrogen-rich stream does not immediately enter the combustor 34 when check valve 7 opens. This is because if the last shutdown utilized an inert gas or air injected through the anode side of fuel cell stack 22 to force out hydrogen, then when check valve 7 first opens the combustor will be supplied with the remaining inert gas or air. In this case, the flow of the stream 26 into the combustor is a blend of fuel processor (effluent) 26 and the other gas which is inert or air. This quantity of this other gas ramps down over time until the flow to the combustor 34 is essentially constituted by fuel processor hydrogen-rich feed effluent 26. If during the last shutdown no external gas was injected into the anode side of the stack, then fuel processor effluent 26 will still not immediately enter the combustor after check valve 7 opens. This is because there is a volume in the line 26 between the check valve 7 and the combustor inlet 42 that contains mainly high pressure air from the cathode side 28 of the stack. This can clearly be seen in FIG. 1 where it is shown that the anode effluent fed through line 26 and the pressurized air fed through line 28 meet together at an inlet portion of the combustor where they are mixed prior to burning. This point of mixing is designated at Z in FIG. 1.

Accordingly, fuel processor hydrogen-rich feed effluent 26 must first essentially push this air volume into the combustor before fuel processor hydrogen effluent 26 alone is admitted into the combustor. In any case, hydrogen-rich gas flow into the combustor at start-up is delayed after check valve 7 opens, and then such flow ramps up as other gases are evacuated from the lines as described immediately above. As can be seen, as check valve 7 opens, the maintaining of combustion temperature is very difficult. Therefore, in another aspect of the invention a method for decreasing combustor liquid fuel 46 injected through injector 43 is also provided to coincide with the increase in the supply of hydrogen-rich feed effluent through line 26 at start-up. By the method of the invention, the heating value represented by the increase in the hydrogen feed stream flow is offset by decreasing the amount of liquid fuel 46 supplied through injector 43. Therefore, as the supply of hydrogen-rich feed to the combustor ramps up, it replaces the liquid fuel 46 supplied to combustor 34. By way of numerical example, if 15 kilowatts of liquid fuel 46 heating value was being injected into the combustor, and 12 kilowatts of hydrogen feed heating value equivalent ramps in, the liquid fuel 46 must ramp down to 3 kilowatts at about the same rate that the hydrogen feed ramps up.

As described above, initially only the combustor liquid fuel through injector 43 is being supplied. At the start of fuel processor injection (point A in FIG. 3), pressure P5 increases because reactants are being reacted in the fuel processor 2. In the time from period A to B of FIG. 3, the check valve 7 does not open. Therefore, the combustor 34 must run on its own liquid fuel 46 supply through injector 43. Eventually, the anode side pressure, as monitored at P5, reaches and exceeds the pressure as monitored at P4. Once pressure P5 exceeds pressure P4 at point B, the check valve 7 opens. At this point, under certain system conditions, it may be possible to relatively quickly discontinue or ramp down the flow of liquid fuel 46 to the combustor while maintaining sufficient heat output from combustor 34 to the fuel processor 2.

In an alternate aspect, to address the anticipated delay in the $H_2$ rich stream from entering combustor 34 described above, a timer may be employed. Under this aspect, a timer starts at time B in FIG. 3. This timer implements a time delay which occurs from time period B to C in FIG. 3. Since the initial flow to the combustor 34 is not constituted by fuel processor hydrogen-rich feed effluent, the combustor liquid fuel injection 46 must remain in order to supply the necessary heat. The anode system volume (capacity in line 26 or 21 and upstream thereof), the mode of shutdown, and the fuel processor start-up energy requirement, determine the length of the time delay (Td). At point C of FIG. 3, the combustor is supplied a mixture of the fuel processor hydrogen-rich feed effluent and any of the other gases present in the anode side piping as described earlier. At point C, it is understood the system conditions may allow a relatively rapid discontinuance or ramp down of liquid fuel 46 while maintaining sufficient heat output from combustor 34.

Figure 3:
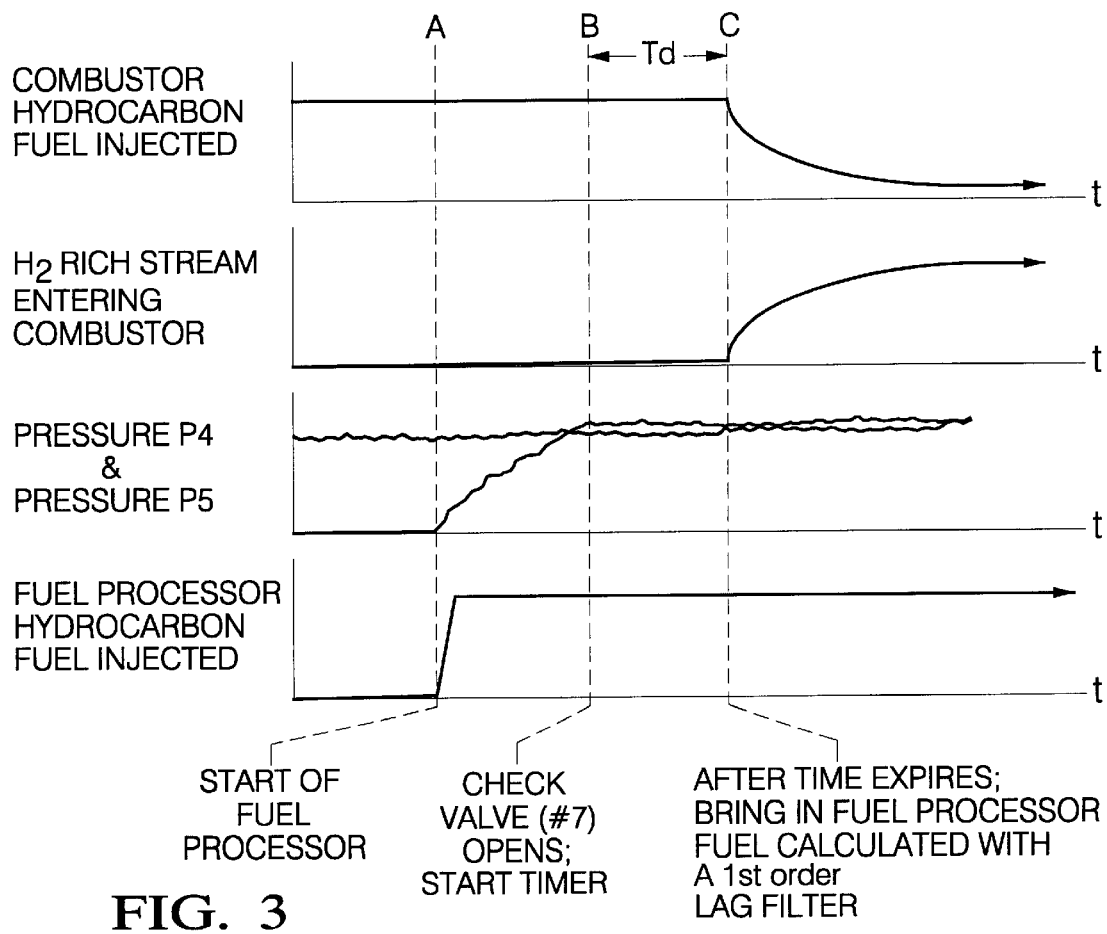
FIG. 3 contains a series of graphs illustrating the start-up mode implemented by the invention, where before and after point A in time, the combustor is operated; between time periods A and B the fuel processor starts operating and continues to operate after point B; at time B a valve opens admitting flow from fuel processor to combustor; and at time C, liquid hydrocarbon fuel to the combustor begins declining.

In a preferred aspect, the above described timer is used in conjunction with a first order lag filter (function) which approximates the phase in of the hydrogen-rich feed stock fuel processor effluent beginning at point C in FIG. 3. Eventually, the fuel processor feed stream effluent 26 pushes out all of the other gases and the calculated hydrogen content supplied from the anode side of fuel cell 22 matches the actual hydrogen content received by the combustor. The time delay (Td) and the lag filter time constant (K) coincide with the volume and dynamics of the fuel processor 2, the fuel cell stack 22, and the fuel processor piping 20, 21 and 26.

The phasing out of the hydrocarbon liquid fuel 46 is also conveniently approximated by a first order lag filter where hydrocarbon fuel input (FI) at time n is proportional to (1−K) times FI at (n−1). Here, the constant K substantially affects the rate at which phase out occurs. At a relatively high value of K, the phasing out will occur slowly. At lower values of K, a more rapid phase out of hydrocarbon fuel input occurs. The typical lag relationship is generalized to: New Value=Last Value+K (Input−Last Value); and where Input is normalized to a step function from 1 to 0. Here, the 1 represents 100% fuel (46) input at the time the lag filter is initiated, and 0 is the condition of termination of fuel (46) input when the combustor 34 runs on hydrogen feed only. As an example, given last value=1 at a given time 1 and K is 0.2, at time 2, the New Value=1+0.2(0−1)=0.8; and at a time 3, New Value is 0.64, according to new value=0.8 +0.2 (0−0.8)=0.64.

It will be appreciated that it is also possible to model the phasing in of the $H_2$-rich feed stream as described above, and by subtraction arrive at the phase out of the hydrocarbon liquid fuel 46.

As can be seen by the representation in FIG. 3, the mode of operation implemented herewith maintains the combustor temperatures throughout start-up and enables a relatively smooth transition from a start-up mode to a running mode in a proactive manner.

The invention provides an effective and inexpensive method to maintain combustor temperature throughout the start-up and through a smooth transition from start-up mode to running mode. Such method is highly desirable since the mass flow of hydrogen from the anode outlet 26 to the combustor 34 is an unknown. Another option for attempting the transition mode described herein would involve monitoring the temperature of the combustor and then attempting to balance the quantity of air and liquid fuel supplied to the combustor as the hydrogen supply increases. In this approach, an attempt is made to change fuel inputs based on combustor temperature. However, monitoring of combustor outlet temperature is reactive and during quick transients, levels of hydrocarbon fuel supplied for processing in the fuel processor can change in milliseconds and the resulting hydrogen delivered to the combustor can also change as fast. By the time the temperature in the combustor rises, the hydrogen has already been delivered and consumed in the combustor. As a consequence, the combustor overheats since adjustment to injector 43 would not have been made in a timely manner. Therefore, the invention provides the advantage of smooth transition from a start to a running mode.

While this invention has been described in terms of certain embodiments thereof, it is not intended that it be limited to the above description, but rather only to the extent set forth in the following claims.

The embodiments of the invention in which an exclusive property or privilege is claimed are defined in the following claims.

What is claimed is:

1. A method of transitioning from a start up mode to a running mode in a fuel cell system including a combustor receiving a pressurized air stream and a hydrocarbon fuel and reacting the pressurized air stream and the fuel to generate heat energy, a fuel processor receiving the heat energy from the combustor and operative to generate a hydrogen rich feed stream, and a fuel cell stack wherein the feed stream is reacted to generate electricity, the method comprising the steps of:

establishing a feed stream flow path from the fuel processor to the combustor;

admitting the feed stream in the flow path into the combustor in response to the pressure of the feed stream in the flow path exceeding the air stream pressure; and decreasing the supply of the hydrocarbon fuel to the combustor in response to admitting the feed stream into the combustor from the flow path, thereby transitioning from a start up mode to a running mode.

2. A method according to claim 1, wherein the step of admitting feed stream in the flow path into the combustor comprises:

blocking flow in a portion of the flow path; and permitting flow in said portion of the flow path, in response to the pressure of the feed stream in the flow path exceeding the air stream pressure.

3. A method according to claim 2, wherein the step of admitting the feed stream in the flow path into the combustor comprises positioning a check valve in said portion of the flow path, whereby said air stream pressure biases said check valve closed when said air stream pressure exceeds the feed stream pressure.

4. A method according to claim 1 wherein the step of decreasing the supply of the hydrocarbon fuel to the combustor includes delaying the initiation of the decrease for a predetermined time following the step of admitting the feed stream in the flow path to allow time for purging of the flow path prior to the admission of the feed stream into the combustor.

5. A method according to claim 4, wherein following initiation of the decrease, the supply of hydrocarbon fuel to the combustor is decreased in proportion to the increase in the supply of feed stream to the combustor to maintain a substantially constant supply of heat energy to the fuel processor.

6. The method according to claim 1 wherein said decrease of said hydrocarbon fuel is conducted to maintain a substantially constant supply of said heat energy.

7. A method of operating a fuel cell system comprising supplying a hydrocarbon fuel and a pressurized air stream to a combustor and reacting the hydrocarbon fuel and the pressurized air stream in the combustor to generate heat for delivery to a fuel processor, reacting a hydrocarbon reactant and at least one reactant selected from the group consisting of steam and air in the fuel processor to generate a hydrogen-rich feed stream, and reacting the feed stream in a fuel cell stack to generate electricity, characterized in that:

a block is established in a flow path from the fuel processor to the combustor;

the pressure of the air stream to the combustor is monitored;

the pressure of the feed stream in the flow path upstream of the block is monitored;

the block in the flow path is removed in response to the feed stream pressure in the flow path exceeding the pressure of the air stream, whereby the feed stream is admitted into the combustor for reaction therein with the air stream; and the supply of the hydrocarbon fuel to the combustor is decreased in response to admission of the feed stream into the combustor for reaction therein with the air stream.

8. A method according to claim 7 wherein the step of decreasing the supply of hydrocarbon fuel to the combustor includes delaying the initiation of the decrease for a predetermined time following removal of the block in the flow path whereby to allow time for the flow path between the block and the combustor to be purged.

9. A method according to claim 8, wherein, following initiation of the decrease, the supply of hydrocarbon fuel to the combustor is decreased in proportion to the increase in the supply of feed stream to the combustor to maintain a substantially constant supply of heat energy to the combustor transitioning from a start up mode to a running mode.

10. A method according to claim 7 wherein the supply of hydrocarbon fuel is decreased in accordance with a first order lag filter calibrated to maintain a combustor temperature while transitioning from a start up mode to a running mode.

11. A method according to claim 7 wherein the block in the flow path comprises a check valve exposed at one side thereof to the feed stream pressure and at another side thereof to the air stream pressure.

12. A method of operating a combustor to heat a fuel processor to an operating temperature, wherein the fuel processor generates hydrogen-rich ($H_2$) feed stream from a hydrocarbon fuel for reaction within a fuel cell stack to generate electricity, said method comprising the steps of:

(1) supplying a hydrocarbon fuel stream to the combustor;

(2) supplying a pressurized air stream to the combustor;

(3) reacting the hydrocarbon fuel stream and the air stream in the combustor to generate heat for heating the fuel processor;

(4) supplying a hydrocarbon reactant and at least one reactant selected from the group consisting of steam and air to the fuel processor, and reacting said reactants in the fuel processor to produce an $H_2$-rich feed stream;

(5) establishing a feed stream flow path from the fuel processor to the combustor;

(6) opening the flow path in response to the pressure of the feed stream in the flow path exceeding the air stream pressure; and (7) decreasing the supply of said hydrocarbon fuel stream to regulate the generation of heat in said combustor.

13. The method of claim 12 which further includes a time delay (Td) between steps (6) and (7).

14. The method of claim 13 wherein said time delay is for a time at least as great as the time required for said $H_2$-rich feed stream to flow from said fuel processor into said combustor.

15. The method of claim 13 wherein said fuel cell stack is arranged in the flow path between said fuel processor and said combustor, and wherein said Td is for a time at least as great as the time required for said $H_2$-rich feed stream to flow in the path from said fuel processor through said fuel cell stack and into said combustor.

16. The method of claim 12 wherein step (7) occurs at a rate sufficient for said combustor to maintain an operating temperature in said fuel processor.

* * * * *